United States Patent [19]
Jackson

[11] Patent Number: 5,407,218
[45] Date of Patent: Apr. 18, 1995

[54] WHEELED COOLER

[76] Inventor: Steven C. Jackson, 8414 Blue Stone Ct., Columbia, Md. 21046

[21] Appl. No.: 200,447

[22] Filed: Feb. 23, 1994

[51] Int. Cl.⁶ .............................................. B62B 3/02
[52] U.S. Cl. .................................. 280/30; 280/47.37; 62/457.7; 62/464; 301/114; D7/605
[58] Field of Search ............... 280/47.34, 47.35, 47.36, 280/47.371, 47.41, 64, 79.11, 79.2, 47.18, 37, 655.1, 659, 79.5, 79.6, 47.26, 43.1, 43, 30, 47.23; D7/605; 62/457.1, 457.7, 464; 301/111, 114, 117, 126, 131

[56] References Cited

U.S. PATENT DOCUMENTS

| | | | |
|---|---|---|---|
| D. 328,550 | 8/1992 | Mogil et al. | D7/605 |
| D. 334,640 | 4/1993 | Florish | 280/47.26 |
| 3,462,171 | 8/1969 | Mitty | 280/47.26 |
| 4,248,453 | 2/1981 | Stark | 280/47.17 |
| 4,262,780 | 4/1981 | Samuelian | 280/47.34 |
| 4,269,157 | 5/1981 | Ciminelli | 280/47.18 |
| 4,621,404 | 11/1986 | Browning | 280/47.26 |
| 4,634,175 | 1/1987 | Wise | 297/191 |
| 4,846,493 | 7/1989 | Mason | 280/655 |
| 4,919,491 | 4/1990 | Heideman | 301/114 |
| 5,306,029 | 4/1994 | Kaiser | 280/30 |
| 5,373,708 | 12/1994 | Dumoulin | 280/43 |

Primary Examiner—Margaret A. Focarino
Assistant Examiner—Anne Marie Boehler
Attorney, Agent, or Firm—Morton J. Rosenberg; David I. Klein

[57] ABSTRACT

A wheeled cooler (10) is provided having an open top housing (22) with a removable cover member (24) forming a closed internal chamber (16) for the storage of articles. At least two wheel members (12) are rotatably secured to opposingly displaced sidewalls (32, 32') of the open top housing (22). The wheel members (12) have a mechanism for removably capturing each of the wheel members (12) individually within a respective transversely displaced sidewall (32, 32'). The wheel capturing mechanism (40) includes a wheel base member (42) which may be inserted in a tongue in groove connection to the sidewalls (32, 32'). In this manner there is provided a wheeled cooler (10) which may easily have the wheel members (12) removable from the housing (22) or inserted within the housing (22) for rotatable transport across a base surface (14).

13 Claims, 2 Drawing Sheets

WHEELED COOLER

BACKGROUND OF THE INVENTION

1. Field of the Invention

This invention directs itself to a wheeled storage carrier and in particular directs itself to a wheeled cooler which may be easily transported across a base surface whether the base surface is planar or non-planar. In particular, this invention directs itself to a wheeled cooler having an open top housing within which there are releasably received wheel members 12. More in particular, the wheel members 12 are releasably captured within opposing sidewalls of the open top housing in a tongue in groove coupling relation. Still further, this invention directs itself to a wheeled cooler where the wheel members may easily be removed and are held in constrainment in both a longitudinal, transverse and vertical direction with respect to the open top housing. Still further, this invention directs itself to a wheeled cooler which allows for storage of articles external to the wheeled cooler and includes a strap member which may be releasably secured to a frontal wall of the wheeled cooler for ease of rotatable transport across a base surface. Still further, this invention directs itself to a wheeled cooler including an open top housing and a cover member which is releasably securable to the open top housing to maintain confinement of articles stored within the wheeled cooler. Still further, this invention directs itself to a wheeled cooler which includes easily removable and insertable wheel members where the wheel members have a particular contour and size relationship to allow the wheel members to be easily and simply rotatably transported across a base surface which may be planar, non-planar or formed of particulate material such as sand.

2. Prior Art

Wheeled coolers and carriers in general are well known in the art. The best prior art known to Applicant includes U.S. Pat. Nos. 2,034,472; 2,317,871; 2,883,73; 3,591,194; 4,164,853; 4,550,931; 4,724,681; 4,846,493; 4,873,841; 4,932,677; 4,976,448; 5,169,164; 5,184,477; and, 5,228,706.

Some prior art portable, wheeled coolers such as those shown in U.S. Pat. No. 4,724,681 include a container member having a releasable enclosure lid member mounted thereon. However, the wheel members are supported on respective ends of a shaft which do not provide for the releasable mechanism of the subject invention concept to allow both removability and insertability in the manner described by the subject system.

Other prior art systems such as that shown in U.S. Pat. No. 4,550,931 direct themselves to wheeled containers. Such include an upwardly open base receptacle having a cover lid with an axle extending transversely across the receptacle. However, such does not provide for the individual insertability and removability of the wheel members as provided in the subject invention system.

Still other prior art such as that shown in U.S. Pat. No. 4,873,841 are directed to portable coolers where the cooler includes a cooler compartment having an axle aperture formed in a lower portion of one end of the receptacle with an axle disposed in the axle aperture. A pair of wheels are rotatably mounted on the axle and secured thereto by wheel nuts. However, such prior art once again does not provide for the individual insertability and removability mechanisms for individual wheel members as is provided in the subject invention concept.

SUMMARY OF THE INVENTION

This invention provides a wheeled cooler which includes an open top housing having a pair of opposing transversely displaced sidewalls as well as opposing longitudinally displaced frontal and rear walls. A cover member is releasably engageable to the open top housing and in combination provides for an internal cooling chamber. At least two wheel members are rotatably secured to opposing transversely displaced sidewalls of the open top housing. A mechanism for removably capturing each of the wheel members individually within a respective one of the opposing transversely displaced sidewalls is provided to allow simplicity of insertion and removal of individual wheel members from the open top housing of the wheeled cooler.

DESCRIPTION OF THE PREFERRED EMBODIMENTS

Figure 3:
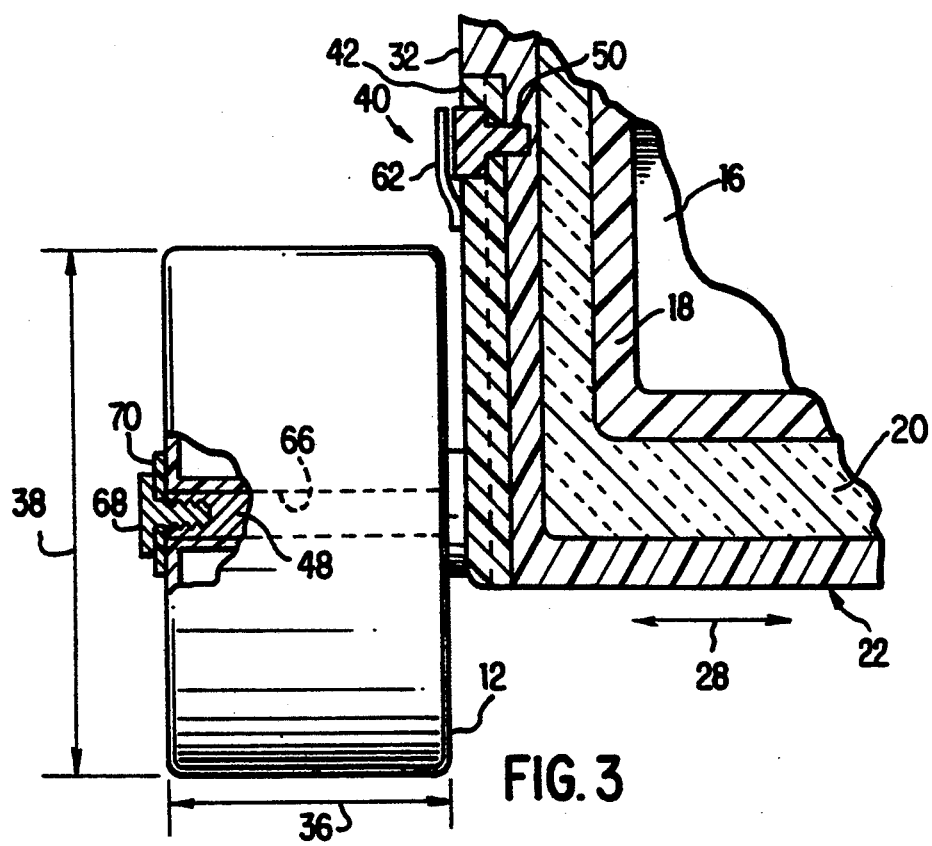
FIG. 3 is a cross-sectional view partially cut-away of the mounting of a wheel member to the open top housing of the subject wheeled cooler.

Referring now to FIGS. 1, 3, 4 and 5, there is shown wheeled cooler 10 having wheel members 12 for rolling displacement on base surface 14. In overall concept, wheeled cooler 10 may be used for storage of items within internal cooling chamber 16 as shown in FIG. 3. Although being referred to as a wheeled cooler 10 in this description it is to be understood that wheeled cooler 10 may apply to any storage container for either storing items to be maintained in a cold condition or alternatively may be stored for maintaining the items at an elevated temperature condition. As shown in FIG. 3, wheeled cooler 10 may include internal walls 18 and insulating compositional materials such as plastic foam 20 as a thermal insulating layer construction however, such is not important to the inventive concept as herein described with the exception that such provides thermal insulation from the external environment.

In broad terms, wheeled cooler 10 is provided to allow the user to have a portable container which may be wheeled on base surface 14 with the added capability of simple removal of wheel members 12 to allow for a stabilization of cooler 10 on any type of base surface 14. Additionally, wheel members 12 are of a large diameter to provide the user with the capability of rolling transportability over a sandy surface such as that found on the beach. Wheeled cooler 10 as herein described allows the user to remove wheel members 12, store such as will be detailed in following paragraphs and position wheeled cooler 10 in a vehicle for transportability to a remote location. Once the user arrives at the site of interest, wheel members 12 may easily be mounted and secured to wheeled cooler 10 and wheeled cooler 10 may then be rollingly transported at the user's behest.

Figure 1:
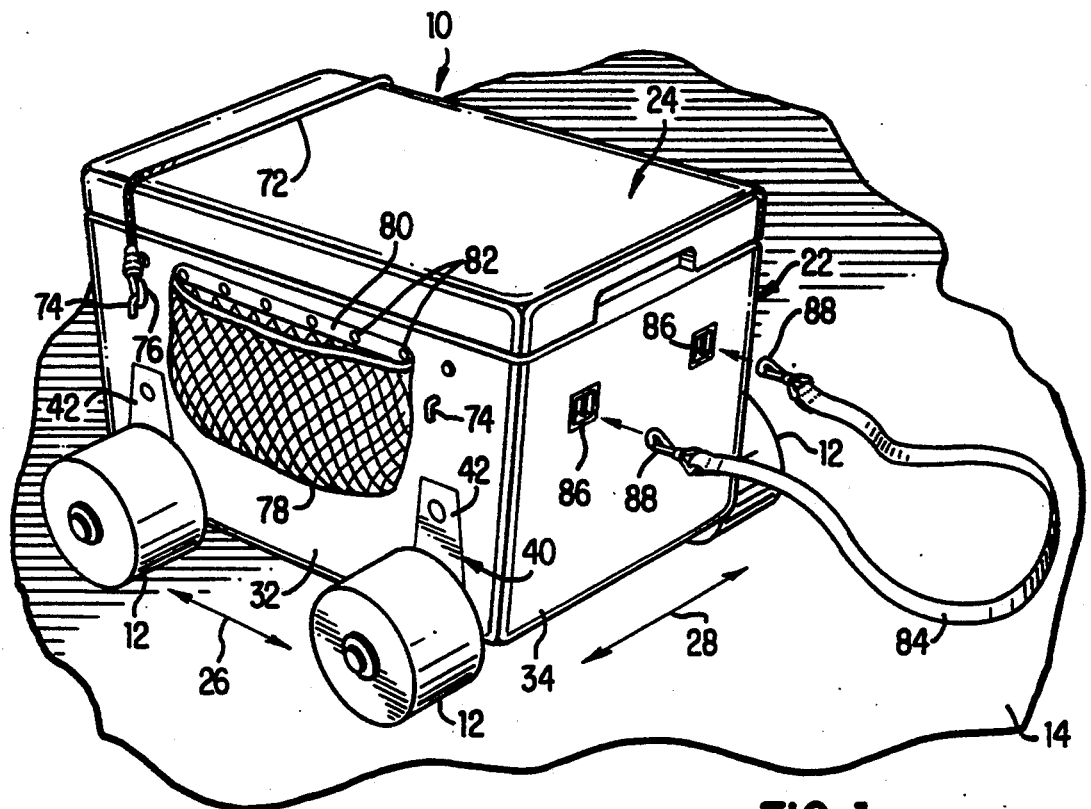
FIG. 1 is a perspective view of the wheeled cooler being rotatably transported on a base surface.
Figure 4:
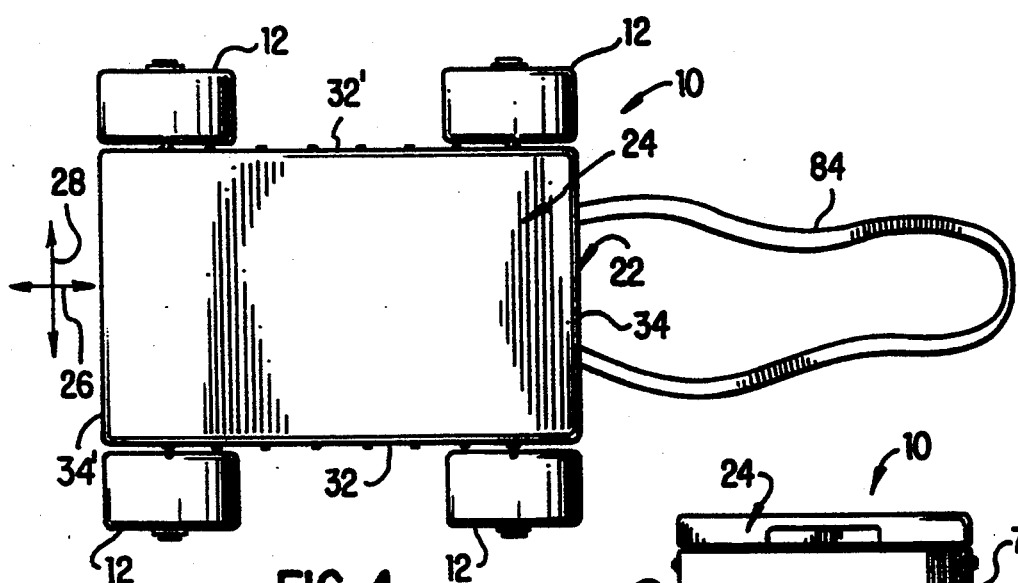
FIG. 4 is a top view of the wheeled cooler.
Figure 5:
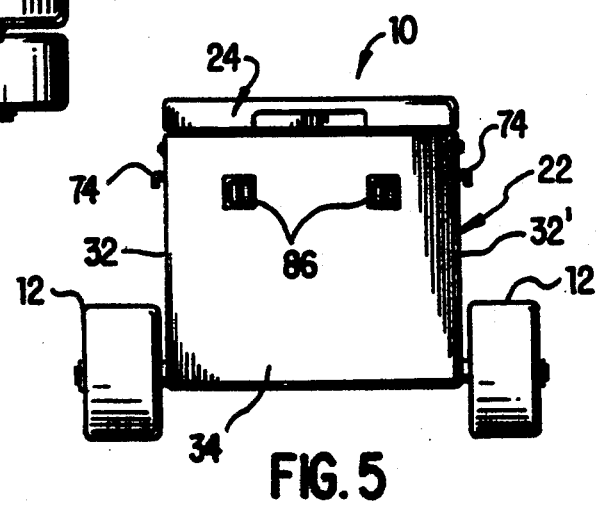
FIG. 5 is a frontal elevational view of the wheeled cooler.

Wheeled cooler 10 includes open top housing 22 having cover member 24 as shown in FIGS. 1, 4 and 5. Cover member 24 matingly engages an upper section of open top housing 22 to provide overall closed internal cooling chamber 16. As is evident, cover member 24 may be removed from open top housing 22 to allow insert or removal of goods within internal chamber 16 of wheeled cooler 10.

Open top housing 22 includes opposing transversely displaced sidewalls 32, 32' which are displaced each from the other in transverse direction 28. Additionally, open top housing 22 includes opposing longitudinally displaced frontal and rear wall members 34, 34' displaced each from the other in longitudinal direction 26 shown in FIG. 1. Opposing sidewalls 32, 32' and front and rear walls 34, 34' may be formed of an open or closed cell type of plastic construction or some like material not important to the inventive concept as herein described with the exception that such have thermal insulative properties necessary to maintain goods within internal chamber 16 for extended periods of time.

One of the important uses of wheeled cooler 10 is for use on a sandy beach. In order to provide rolling capability where the beach surface is base surface 14, a very wide wheel member 12 must be accommodated to provide a large surface area in contact with base surface 14. Although it is extremely difficult to quantify the relative relationships between the length 36 of wheel member 12 to the diameter 38 of wheel member 12, the ease of rolling transportability over a sandy beach is greatly optimized when wheel length 36 is equal to or greater than wheel diameter 38. Basically, the relationship of wheel diameter 38 to wheel length 36 as shown in FIG. 3 provides for the cross-sectional area of wheel member 12 to be equal to the surface area of contact to base surface 14 when wheel diameter 38 is four times the wheel length 36. Empirical data has found that as the wheel length 36 increases with respect to wheel diameter 38, that the ease of transportability over base surface 14 is generally enhanced. Of course optimum dimensional parameters are based on numerous independent parameters such as weight of load within internal chamber 16 as well as the type of base surface 14 upon which wheeled cooler 10 is being rotatably transported.

Wheel members 12 may be formed of a closed cell plastic or metal or some like composition not important to the inventive concept as herein described with the exception that whatever composition is being used does have sufficient structural integrity to support wheeled cooler 10 in combination with the stored goods within internal chamber 16.

Figure 2:
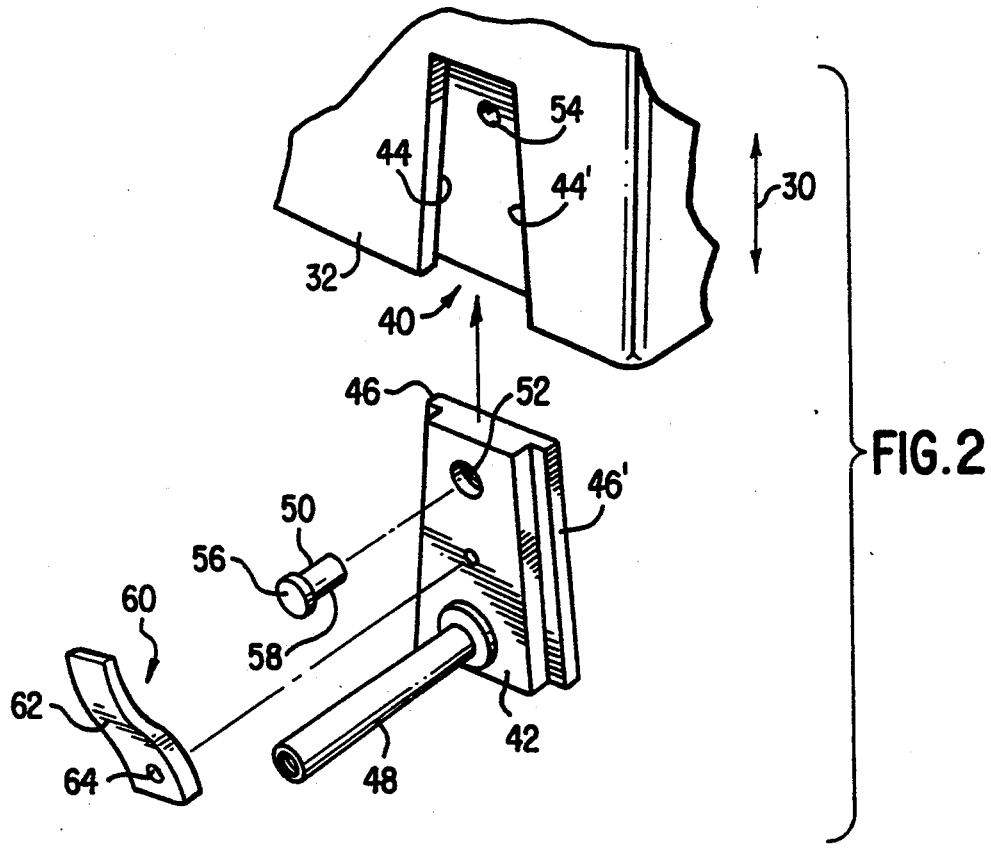
FIG. 2 is a perspective view partially cut-away showing the mechanism for removably capturing individual wheel members within the open top housing of the subject wheeled cooler.

As can be seen in FIGS. 1, 4 and 5, there are provided four wheel members 12 which are rotatively secured to opposing transversely displaced sidewalls 32, 32' of open top housing 27 at a lower section thereof. Additionally, there is provided removable capturing mechanism 40 to capture each wheel member 12 individually within a respective one of opposing transversely displaced sidewalls 32 and 32' as is more particularly shown in FIGS. 2 and 3. Removable capturing mechanism 40 includes wheel base member 42 which is insertable in vertical direction 30 within a pair of longitudinally displaced grooves 44, 44' formed in sidewalls 32, 32' as is clearly seen in FIG. 2 and FIG. 3. Wheel base member 42 is generally step like in contour having longitudinally extended lugs 46, 46' for mating insert within respective grooves 44, 44'. As is seen in FIGS. 2 and 3, this provides a tongue-in-groove securement mechanism. Wheel base member 42 may include inclined vertically extending lugs 46, 46' to provide a wedge shaped cross-sectional contour to allow for sliding insert into respective grooves 46, 46' in a manner to maintain a tightened fitting relation between wheel base member 42 and a respective sidewall 32 or 32'. This wedge type contour allows a further securement of wheel base member 42 to open top housing 16. Alternatively, it is to be understood that wheel base member 42 may have a rectangular cross-section with no inclination of lugs 46, 46' however, the tongue-in-groove coupling is maintained in this contouring configuration.

Removable capturing mechanism 40 further includes wheel axle 48 as shown in FIG. 2 which extends substantially perpendicular to wheel base member 42 and is rigidly secured thereto through bonding, bolting or some like mechanism not important to the inventive concept as herein defined with the exception that wheel axle 48 be firmly secured or alternatively formed in one-piece formation with wheel base member 42. Additionally, wheel axle 48 may be formed of a metal, plastic, or some like material common to wheel base member 42 with the only requirement being that the combined wheel base member 42 and wheel axle 48 be structurally sufficient in integrity to maintain the loads imposed thereon. As can be seen, wheel members 12 are mounted on wheel axles 48 and are rotatable with respect to wheel axles 48 and wheel base members 42. In this manner, with rigid securement between wheel base members 42 and open top housing 22, wheel members 12 are free to rotate and allow rotatable transportability on base surface 14.

With the tongue-in-groove coupling concept between wheel base member 42 and open top housing 22 there is provided displacement constrainability in longitudinal direction 26. However, wheeled cooler 10 will be passing over generally non-planar base surfaces 14 and wheel members 12 may be displaced in vertical direction 30 during rolling transport. In order to provide constrainment in vertical direction 30 for wheel members 12, there is provided wheel base pin member 50 which is insertable through wheel base member through opening 52 and extends therethrough into sidewall recess 54 which is seen in FIG. 2 and in cross-section in FIG. 3. In this manner, wheel base pin member 50 couples wheel base member 42 and open top housing 22 in constrained relation with respect to vertical direction 30 and allows for this constrainment to be maintained even when base surface 14 is non-planar in contour. In general, wheel base pin member 50 includes wheel base pin member head 56 and wheel base pin member stem 58 which is insertable through opening 52 into recess 54. Head 56 extends slightly above an upper surface of wheel base member 42 to allow ease of sliding removal of wheel base pin member 50 when wheel members 12 are being removed from wheeled cooler 10. Thus, wheel base pin member 50 may easily be removed from recess 54 and opening 52 by grasping wheel base pin member head 56 and sliding such out of contact with sidewall 32 and wheel base member 42. Subsequent to this action, wheel base member 42 may be removed in a downward vertical direction 30 from grooves 44, 44' and wheeled cooler 10 may then be placed on a base surface 14 in a stable and non-rolling condition.

During transportability over base surface 14, there is the possibility that wheel base pin member 50 can become dislodged from opening 52 and recess 54. Spring biasing mechanism 60 is provided in the form of leaf spring member 62 which is pinned at 64 to wheel base member 42. In this manner, as shown in FIG. 3, leaf spring member 62 may be pivoted about pin 64 to cover wheel base pin member head 56 and maintain such in contact with opening 52 and recess 54. When it is desired to remove wheel members 12, leaf spring member 62 may be rotated about pivot 64 and wheel base pin member 50 removed from the recesses 54 and opening 52.

As seen in FIG. 3, wheel members 12 are mounted to wheel axle 48 through threaded wheel bolt 68 being threadedly engaged with wheel axle 48 as shown. Wheel axle 48 is insertable through wheel axis opening 66 extending in transverse direction 28. Obviously, wheel member 12 having its associated wheel axis opening 66 with a diameter slightly greater than wheel axle 48 allows for rotation of wheel member 12 on axle 48. Threaded wheel bolt 68 is threaded into wheel axle 48 and wheel washer 70 is sandwiched between a head member of bolt 68 and wheel member 12 to provide interfacing relationship.

In order to releasably secure cover member 24 to open top housing 22, there is provided opposing sidewall hook members 74 shown in FIGS. 1 and 5. Resilient cord 72 includes opposing end loop contoured ends 76 which may be looped around respective sidewall hook members 74. Resilient cord 72 may be either resilient and flexible such as being formed of a rubber composition or may merely be a flexible rope like member formed of a textile compositional structure. In this manner, cover 24 may be somewhat firmly secured to open top housing 22 during transport over rough terrain or other non-planar type base surfaces 14.

Still further, wheeled cooler 10 may include pocket member 78 releasably mounted on sidewall 32 as is shown in FIG. 1. Pocket member 78 may be formed of a mesh like construction and further formed of a textile composition. The mesh like structure will allow for sand or other particulates to be displaced external to pocket member 78 during the normal course of transporting wheeled cooler 10. In this manner, particulates such as sand or other like small particles will not be maintained within pocket member 78. Pocket member 78 may be used for transporting other articles not necessary to be inserted into internal chamber 16 and further may be even used for storing wheel members 12 when such are removed from wheeled cooler 10. Pocket member 78 may include upper bar 80 which is releasably secured to sidewall 32 by a standard snap hook coupling 82. Alternatively, pocket bar member 80 may be mounted in fixed relation to sidewall 32 through any type of fixed securement mechanism such as bolts, rivets, adhesive bonding or like technique.

Strap member 84 may be releasably mounted to frontal wall 34 as is seen in FIGS. 1 and 4. Frontal wall 34 has frontal wall lugs or hooking members 86 formed therein for coupling to closed strap hooks 88 formed on opposing ends of strap member 84. In this way, closed strap hooks 88 may be mounted on frontal wall hooks 86 for ease of rotational transportability of wheeled cooler 10 across base surface 14.

In the manner previously described there now has been provided an extremely versatile wheeled cooler 10 which allows the user a wide variation of usable environments for cooler 10. Wheeled cooler 10 may be used as a standard cooler with the removal of wheel members 12 to allow cooler 10 to be maintained in a stationary position within a vehicle during transport or for storage purposes. When the user reaches a destination where cooler 10 is to be wheeled across a base surface 14, the unique construction of wheel members 12 and the capturing insert mechanism into open top housing 22 allows the user to quickly and easily mount wheel members 12 to the external surfaces of housing 22. Additionally, the unique geometrical construction and contouring of wheel members 12 allows a large surface area to be provided in contact with base surface 14 to allow rotational transportability in an easy manner across non-planar surfaces. Still further, the cover member 24 is maintained in mating engagement with open top housing 22 through a securement resilient cord 72 mounted on opposing sidewall surfaces 32, 32'. Additional storage space is provided by pocket member 78 which may either be fixedly secured or releasably securable to sidewalls 32 and 32' at the discretion of the user. Finally, for further ease of rolling transportability across base surface 14, a flexible strap member 84 having opposing hook members attachable to frontal wall 34 is provided which allows the user to transport wheeled cooler 10 with the least amount of effort.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A wheeled cooler comprising:
   (a) an open top housing having a pair of opposing transversely displaced sidewalls and opposing longitudinally displaced frontal and rear walls, said open top housing defining an internal cooling chamber;
   (b) a cover member releasably engageable to said open top housing:
   (c) at least two wheel members rotatably secured to said opposing transversely displaced sidewalls of said open top housing;
   (d) means for removably capturing each of said wheel members individually within a respective one of said opposing transversely displaced sidewalls, said means for removably capturing each of said wheel members including a wheel base member slidably insertable in a vertical direction within a pair of longitudinally displaced grooves formed in said sidewall of said housing and a wheel axle extending substantially normal said wheel base member, each of said wheel members being rotatably coupled to a respective wheel base member;
   (e) means for vertically capturing each of said wheel base members to a respective one of said sidewalls within said longitudinally displaced grooves, including a respective wheel base pin member insertable through a respective wheel base through opening formed through a respective wheel base member, said wheel base through opening alignable with a housing sidewall recess for insert of said wheel base pin therein; and, (f) means for releasably securing said wheel base pin member to said wheel base member and said housing sidewall including spring biasing means mounted to said wheel base member and contiguous said base pin member for applying a force loading to said base pin member to maintain said base pin member within said sidewall recess.

2. The wheeled cooler as recited in claim 1 where said wheel base member and said sidewall of said housing are releasably coupled through a tongue in groove securement.

3. The wheeled cooler as recited in claim 1 where said wheel base member is wedge shaped in cross-sectional contour for sliding insert into said grooves in said substantially vertical direction.

4. The wheeled cooler as recited in claim 1 where said spring biasing means includes a leaf spring member secured to said wheel base member and selectively positionable over said wheel base member through opening.

5. The wheeled cooler as recited in claim 1 including means for removably securing each of said wheel members to a respective wheel axle on one end of each of said wheel axles.

6. The wheeled cooler as recited in claim 5 where said means for removably securing each of said wheel members includes:

(a) a threaded bolt member for threaded engagement with a threaded opening formed within said end of said wheel axle; and, (b) a washer member having a central hole for insert therethrough of a stem of said threaded bolt member, said washer member having a diameter greater than a diameter of said wheel axle.

7. The wheeled cooler as recited in claim 1 including means for releasably securing said cover member to said open top housing.

8. The wheeled cooler as recited in claim 7 where said means for releasably securing said cover member includes:

(a) a pair of hook members secured to an external surface of said opposing housing sidewalls; and, (b) a flexible cord member having opposing loop contoured ends, said opposing loop contoured ends being insertable on respective hook members.

9. The wheeled cooler as recited in claim 8 where said flexible cord member is a resilient cord.

10. The wheeled cooler as recited in claim 1 including a pocket member secured to at least one of said sidewalls of said open top housing.

11. The wheeled cooler as recited in claim 10 where said pocket member is formed as a mesh pocket member releasably secured to at least one of said sidewalls of said open top housing.

12. The wheeled cooler as recited in claim 1 including removable handle means securable to said housing frontal wall for permitting pulling of said wheeled cooler on a base surface.

13. The wheeled cooler as recited in claim 12 where said handle means includes:

(a) a flexible strap member having opposing ends;

(b) a pair of closeable clip members secured respectively to said opposing ends of said flexible strap member; and, (c) a pair of frontal hook members mounted to said wheeled cooler frontal wall for engagement with said closeable clip members.

* * * * *